United States Patent
Mughannam

[15] 3,662,870
[45] May 16, 1972

[54] CONTAINER RE-ORIENTING MECHANISM

[72] Inventor: Adil A. Mughannam, San Jose, Calif.
[73] Assignee: FMC Corporation, San Jose, Calif.
[22] Filed: Aug. 24, 1970
[21] Appl. No.: 66,513

[52] U.S. Cl. ........................................................... 198/29
[51] Int. Cl. ........................................................ B65g 47/22
[58] Field of Search ......................... 198/29, 131, 33 AD

[56] References Cited

UNITED STATES PATENTS 1,941,219  12/1933  Neff ........................................ 198/29 X

FOREIGN PATENTS OR APPLICATIONS 544,204  6/1956  Italy ........................................ 198/29 X Primary Examiner—Edward A. Sroka
Attorney—F. W. Anderson and C. E. Tripp

[57] ABSTRACT

A container orienting device, for a hydrostatic cooker of the type having a conveyor comprising multiple I-beam carriers thereon, for returning containers into a proper orientation prior to reaching the discharge point. Containers which have become misoriented due to articulation of the conveyor are properly reoriented by a container orienting device comprising a pivotal finger which is inserted between said I-beam carriers in timed relation to the motion thereof for engaging the side surface of the containers and urging them into a properly oriented position.

5 Claims, 6 Drawing Figures

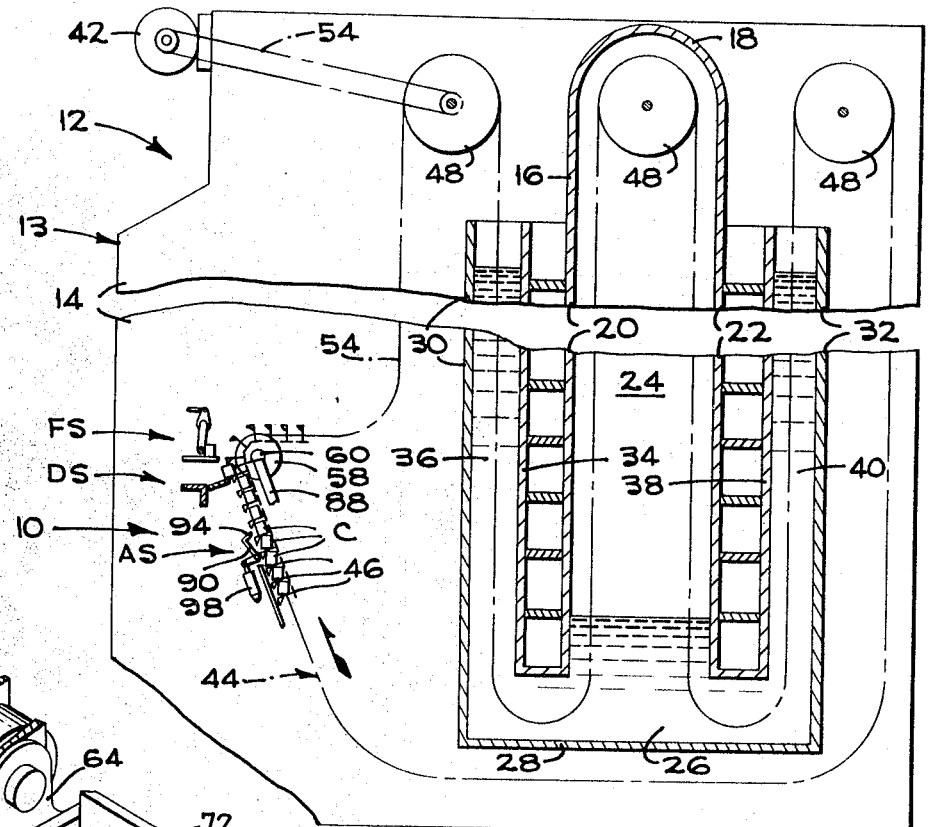
FIG_1
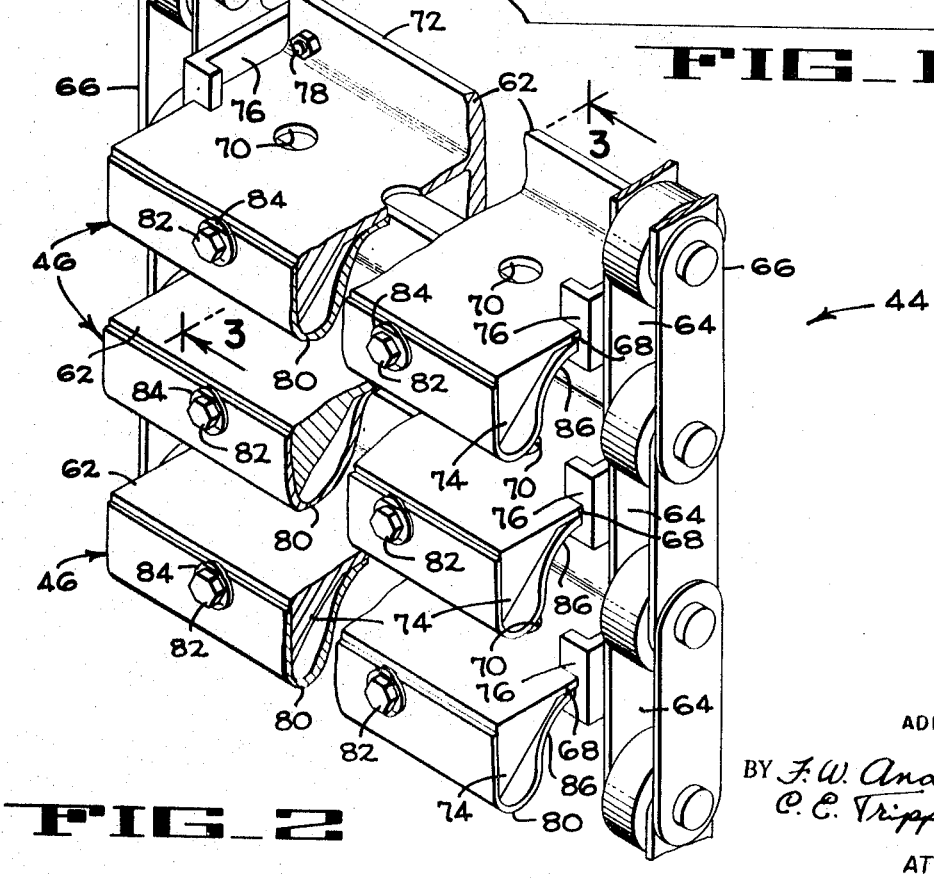
FIG_2
INVENTOR.
ADIL A. MUGHANNAM
BY F. W. Anderson
C. C. Tripp
ATTORNEYS

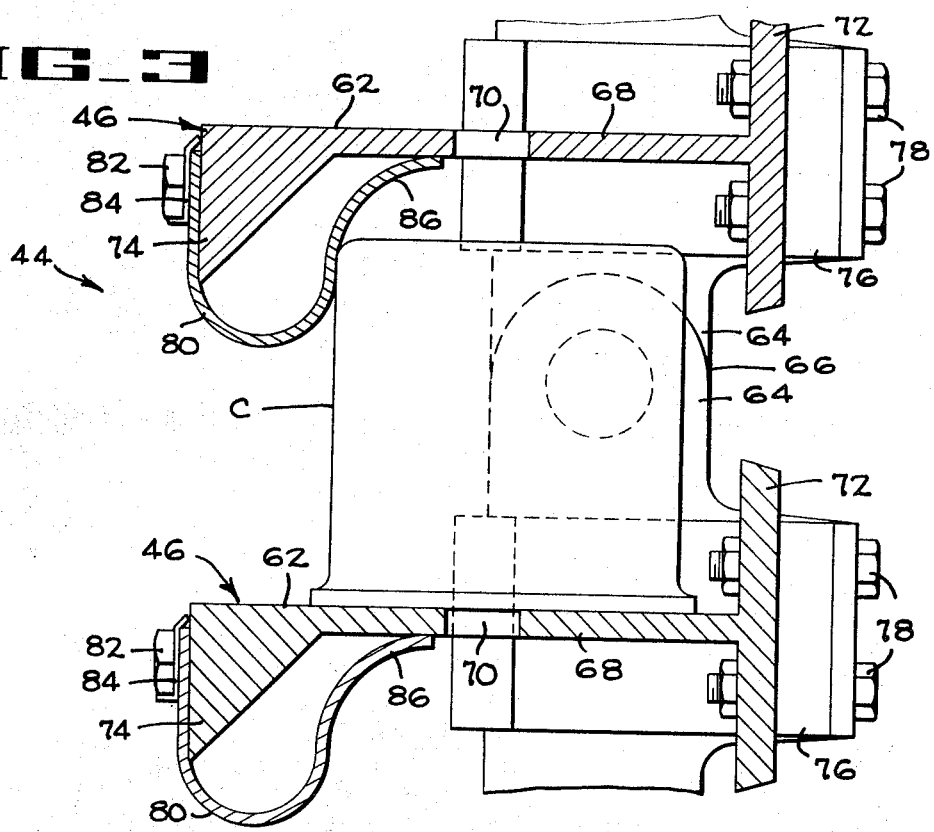
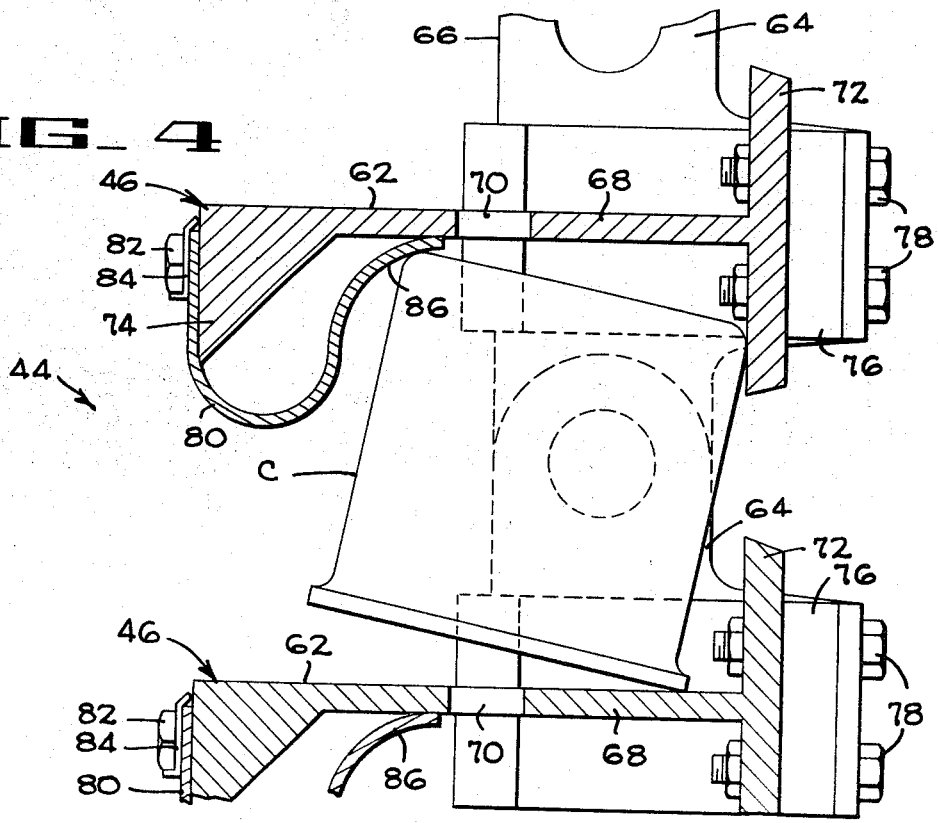

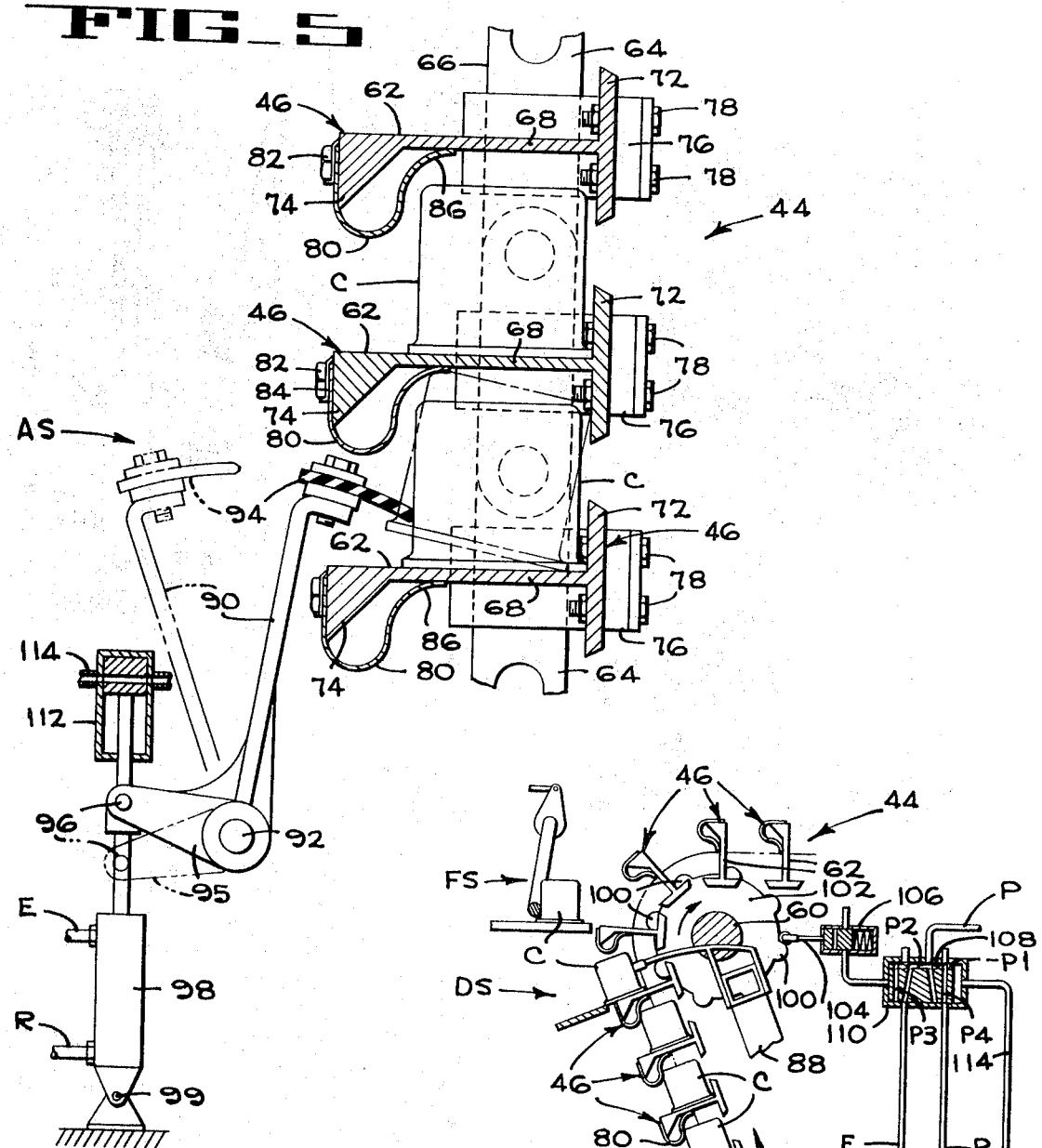
FIG_5
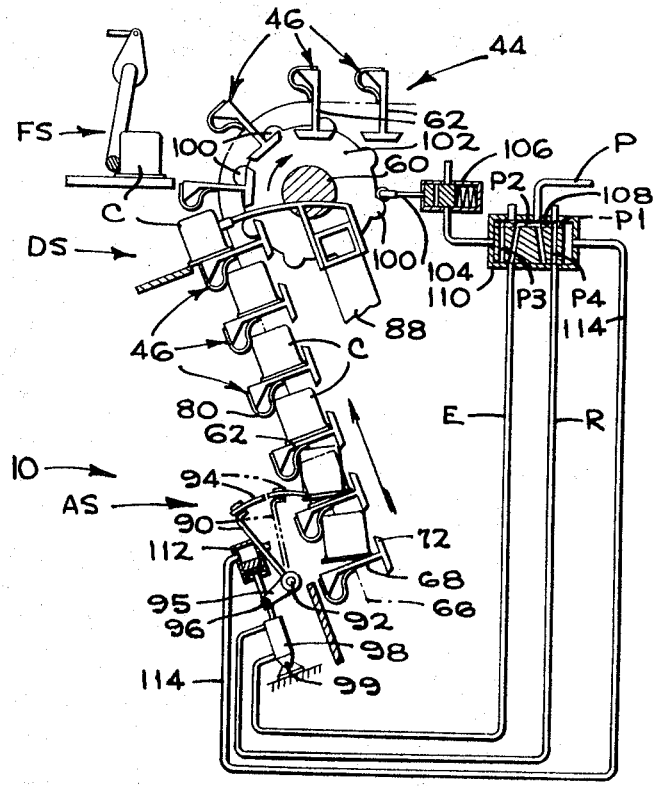
FIG_6

CONTAINER RE-ORIENTING MECHANISM

BACKGROUND OF THE INVENTION

1. Field of the Invention

The present invention pertains to hydrostatic cookers and more particularly to a container orienting mechanism. The orienting mechanism is employed to reorient any containers carried by a continuously advancing processing conveyor that have become misaligned prior to reaching a discharge station.

2. SUMMARY OF THE INVENTION

The purpose of the present invention is to reorient multiple containers carried in rows by a processing conveyor of a hydrostatic cooker. The conveyor comprises multiple I-beam carriers between which the containers are supported. As the conveyor progresses through the various chambers of the cooker, it is subjected to a series of bends. Furthermore, the containers are subjected to vibration and shifting as they enter and leave fluid filled chambers of the cooker. The containers and contents may vary somewhat in density so that some may tend to float while others sink. All of these factors contribute to misorientation of the containers.

One type of container, in particular those having a rather short length with respect to their diameter in a ratio in the order of 1 ½:1, tends to jam between adjacent carriers. Since the containers are carried in long rows between the carrier, the jamming or mis-alignment of a single container prevents discharge of the entire row. This can result in bursting or damage of a great number of containers and usually requires the large cooker to be shut down and cleared.

The object of the present invention is to provide a simple but effective mechanism for insuring proper orientation of the containers immediately prior to the discharge station. This object is achieved by providing an actuating arm that is inserted between the carriers in timed relation to their advancement to exert a downward and inward force against the containers so that any containers that have become tilted on their carriers are shifted into the proper position where there bottoms lie flat on their carriers.

DESCRIPTION OF THE DRAWINGS

FIG. 1 is a diagrammatic vertical section taken through a hydrostatic cooker having a single feed and discharge station, the feed and discharge station being illustrated at a greatly exaggerated scale.

FIG. 2 is a perspective view of the I-beam processing conveyor.

FIG. 3 is a cross-section of the processing conveyor with a properly oriented container therein, taken on line 3—3 of FIG. 2.

FIG. 4 is a view similar to FIG. 3 with a container in a misaligned position.

FIG. 5 is an enlarged diagrammatic view of the feed and discharge area showing the container orienting mechanism.

FIG. 6 is a schematic view of the actuation and timing mechanism of the container orienter.

DESCRIPTION OF THE PREFERRED EMBODIMENT

Hydrostatic Cooker

The container orienting mechanism of the present invention, is associated with a feed and discharge system 10 (FIG. 1) such as described in United States patent application Ser. No. 785,174 by Smith et al., filed Dec. 19, 1968, now U.S. Pat. No. 3,568,816 assigned to the FMC Corporation, now U.S. Pat. No. 3,568,816, issued Mar. 9, 1971, that is employed with a hydrostatic cooker of well known design. The hydrostatic cooker 12 comprises a frame 13 that includes a pair of spaced vertical support walls 14 (only one wall being shown in FIG. 1) that are supported in spaced parallel relationship. A housing 16 which extends between the two walls 14 has a rounded upper end 18 and two depending walls 20 and 22 which cooperate with the two walls 14 to define a cooking chamber 24 which is filled with steam at a predetermined cooking pressure and temperature, for example, at about 250° to 275° F. and 15 to 20 psig. The lower end of the housing 16 opens into a water filled trough or chamber 26 which is formed by the two walls 14, a transverse horizontal plate 28 and the lower end portions of two transverse vertical walls 30 and 32. The wall 30 cooperates with another transverse wall 34 to define an inlet hydrostatic waterleg 36 and the wall 32 cooperates with a transverse vertical 38 to provide an outlet hydrostatic waterleg 40. The hydrostatic legs 36 and 40 cooperate with the chamber 26 and are filled with water so as to create sufficient pressure of the steam in the cooking chamber 24. The inlet hydrostatic waterleg 36 is thermostatically controlled to provide a gradually increasing water temperature from approximately 210° F. at its upper end to approximately the sterilizing temperature in the steam chamber at its lower end. The outlet waterleg 40 is also thermostatically controlled to provide a gradually decreasing temperature from approximately the sterilizing temperature at its lower end to any suitable temperature below the boiling point of water, for example 45° F at its upper end. Steam is added to the water in the hydrostatic inlet waterleg 36 to provide the desired temperature therein, and cooling water is directed into the outlet or cooling leg 40 to provide the desired cooling temperature therein.

Rows of containers generally designated by the letter C are advanced through the hydrostatic cooker 12 by a continuously advancing processing conveyor 44 having I-beam carriers 46 thereon. The processing conveyor 44 is trained around pairs of sprockets 48 that are rotatively supported by the vertical wall 14 to guide the conveyor along a circuitous path. The conveyor 44 is driven by a motor 42 which is connected to one or more of the pairs of sprockets 48 by a chain drive 54.

The processing conveyor 44 is also trained around a pair of large diameter sprockets or wheels 58 of the feed and discharge system 10. The sprockets 58 are mounted on a shaft 60 journaled on the frame of the cooker, the sprockets 58 are of a small diameter and serve to fully open the carriers 46 at the feed station FS and discharge station DS. All rows of containers are consequently discharged from the carriers at the discharge station DS. As will be seen presently, the orienting mechanism of the present invention insures that no containers in a row will jam in the carriers and thus hold up the discharge operation for the entire row.

As best seen in FIG. 2, the processing conveyor 44 comprises multiple transverse I-beam carrier bars 62 suspended between side plates 64 of a pair of conveyor chains 66. Each carrier bar 62 includes an elongate radial web 68 having a plurality of drain holes 70. An inner retaining flange 72 is integrally formed on one edge of the web 68 and a generally V-shaped outer confining flange 74 is formed on the front or container receiving edge of the radial web. The carrier bars 62 are connected to the spaced parallel endless chains 66 by means of end brackets 76 on side plates 64 of the chains by cooperating bolts 78.

Under the present invention and as seen in FIGS. 2 through 4, adapters 80 are attached to the confining flange 74 by means of bolts 82 that are retained by tab lock washers 84. These adapters extend beneath the confining flanges 74 and curve upwardly against the under side of the radial flanges 68 as indicated at 86. The adapters 80, provided to reduce jamming of the containers between the radial webs 68, are the subject matter of U.S. Pat. application Ser. No. 16,890 by James L. Reimers, filed Mar. 5, 1970, now U.S. Pat. No. 3,613,865, issued Oct. 19, 1971, and assigned to the FMC Corporation. The problem created by misaligned containers (FIG. 4) has not been completely eliminated by these adapters.

As the containers retain between adjacent I-beam carrier bars 62 progress through the hydrostatic cooker 12 generally shown in FIG. 1 and particularly as they move through the inlet and outlet hydrostatic waterlegs and pass around the various sprockets. The containers are subject to shifting between the carrier bars 62. At the end of the cooking process the containers approach the sprocket 58 and open as they pass around the sprocket.

Located at the lower portion of the sprocket 58 is the discharge mechanism DS. The discharge mechanism includes an arm 88 having a bar on its upper end for engaging the containers C. The arm moves in a timed relation with the processing conveyor 44, projecting into the space between the inner flange 72 of the carriers 62 with a reciprocating motion such that the bar on the arm 88 forces a row of the containers C outwardly from the spread carriers.

The remainder of the mechanism for discharging the containers from the processing conveyor is described in the aforementioned Reimers application and the details of its operation are not critical to the present invention.

ORIENTING MECHANISM

It has been found that if any one of the multiple containers carried between a pair of carrier bars 62 is misaligned such as seen in FIG. 4 the misaligned containers will jam between the bars when they are urged outwardly by the actuating arm 88 of the discharge station DS. This will prevent the actuating arm from pushing out an entire row of containers.

Under the present invention all of the containers approaching the discharge station DS are correctly aligned so that no jamming will occur upon discharge. As seen in FIG. 1, a special container orienting arm 90 is placed at the alignment station AS just upstream of the discharge station DS. The container orienting mechanism basically comprises the container engaging arm 90 mounted on a shaft 92 (FIG. 5) that is suitably pivoted to the frame (not shown) of the hydrostatic cooker. The upper portion of the arm 90 mounts a strip 94 for engaging the side walls of the container C. The container engaging strip 94 is preferably formed of a flexible or resilient material such as rubber, rubberized fabric or the like to prevent denting or damage to the containers. A crank 95 projects from the pivot end of the arm 90 and the crank is pivoted at 96 to the piston rod 97 of a double acting pneumatic cylinder 98. The cylinder is pivoted at 99 to a frame element of the cooker. The container orienting mechanism further comprises a series of pneumatic valves seen in FIG. 6 which actuate the container engaging arm 90 between the positions as shown in solid and broken line in timed relation to the continuous movement of the processing conveyor 44.

As illustrated in FIGS. 5 and 6, the container engaging arm 90 is moved from the retracted position shown in broken line in FIG. 5 to the extended position shown in solid line in response to one of the eight lobes 100 of a timing cam 102 keyed to the sprocket shaft 60 at the feed station FS (FIG. 1). Upon contacting one of the lobes 100 an actuating arm 104 actuates a pneumatic vent valve 106. This valve controls the position of a core 108 of a master 110 which directs air under pressure to the double acting pneumatic cylinder 98 through line E to cause the cylinder 98 to extend.

The master valve 110, of a well known type receives high pressure air from a pressure line P and continuously directs pressure to both sides of the valve through a small passage P1. Thus, the momentary opening of vent valve 106 causes the core 108 to shift from the right end to the low pressure left end of the valve. As illustrated in FIG. 6, the valve 106 has just been actuated and the core 108 of the master valve has shifted to the left. Opening vent valve 108 causes the core to shift to the position of FIG. 6 so that air under pressure from line P flows through the core passage P2 into line E causing the pneumatic cylinder to extend. The return line R from the double acting is simultaneously vented to the atmosphere through core passage P4.

As the container engaging arm 90 is fully extended, a pneumatic vent valve 112 opens a line 114, that leads to the right side of the master valve 110 to the atmosphere. The venting of line 114 reduces the pressure on the right side of the core 108 causing it to shift to the right. As a result high pressure air from line P will flow through passage P4 in the core and into line R causing the cylinder to retract while line E is vented to atmosphere through passage P3.

OPERATION

As the carriers arrive at the alignment station AS as seen in FIG. 5, the container engaging arm 90 is extended between the I-beam members 62 in timed relation to the carrier motion by the lobe cam 102 mounted on the carrier sprocket shaft 60. As the engaging arm is extended, the resilient edge 94 thereon engages aligned and misaligned containers with an inward and downward arcuate motion displacing the containers against the rear upstanding legs 72 of the carrier bar so that the flat bottom faces of the containers C lie flat on the radially extending webs 68 of the carriers. The combination of forces exerted on the container inwardly toward the retaining flange 72 and downwardly toward the carrier web 68 frees any container that may be lodged between the carriers and the adapters 80 or any containers that may be rim locked with an adjacent container into the uniform aligned position in solid line in FIG. 5. The container engaging arm is then retracted and the carriers 62 with properly aligned containers C advance to the discharge station DS where they are ejected without jamming between the carriers.

Although the best mode contemplated for carrying out the present invention has been herein shown and described, it will be apparent that modification and variation may be made without departing from what is regarded to be the subject matter of the invention.

I claim:

1. In a hydrostatic cooker for containers that have relatively flat faces on which they rest during cooking, said cooker being of the type comprising a frame, a conveyor on said frame having transverse container carriers and means for discharging rows of containers from the outer sides of said carriers, running generally vertically up to said discharging means with said carriers vertically spaced, the improvement comprising container orienting means having a vertical dimension less than the spacing between adjacent carriers, means mounting said orienting means on the frame at the outside of said carriers and below the container discharge means, said mounting means providing for reciprocating motion of said orienting means into and out of the space between adjacent carriers for shifting containers that have been tilted on their carriers into positions wherein they lie flat on their carriers, and means for synchronizing said orienting means with the motion of said conveyor.

2. The hydrostatic cooker of claim 1, wherein said orienter synchronizing means comprises an actuator for reciprocating said orienting means, a timing device driven by said conveyor, and means for controlling said actuator by said timing device.

3. The hydrostatic cooker of claim 2, wherein said timing device comprises a multi-lobed cam having lobes that move in analogue with said conveyor carriers.

4. In a hydrostatic cooker for containers that have relatively flat faces on which they rest during cooking, said cooker being of the type comprising a frame, a conveyor on said frame having transverse container carriers and means for discharging rows of containers from the outer sides of said carriers at an elevating portion of said conveyor; the improvement comprising container orienting arm means pivoted on said frame and having a container engaging bar projecting inwardly from said arm means and below the container discharge means, means for moving said orienting means in a direction that has a component directed inward of the conveyor and a component directed toward the container supporting surface of an adjacent carrier for shifting containers that have been tilted on their carriers into positions wherein they lie flat on their carriers, and means for synchronizing said orienting arm means with the motion of said conveyor.

5. The hydrostatic cooker of claim 4, wherein said container engaging bar comprises a rubber-like element for preventing damage to the containers.

* * * * *